(12) United States Patent
Soccorsy

(10) Patent No.: US 11,074,577 B1
(45) Date of Patent: Jul. 27, 2021

(54) SYSTEMS AND METHODS FOR MAKING PERSON-TO-PERSON PAYMENTS VIA MOBILE CLIENT APPLICATION

(71) Applicant: Wells Fargo Bank, N.A., San Francisco, CA (US)

(72) Inventor: Benjamin Soccorsy, Larkspur, CA (US)

(73) Assignee: WELLS FARGO BANK, N.A., San Francisco, CA (US)

( * ) Notice: Subject to any disclaimer, the term of this patent is extended or adjusted under 35 U.S.C. 154(b) by 0 days.

(21) Appl. No.: 16/407,778

(22) Filed: May 9, 2019

Related U.S. Application Data

(60) Provisional application No. 62/669,865, filed on May 10, 2018.

(51) Int. Cl.
  *G06Q 40/06*  (2012.01)
  *G06Q 20/38*  (2012.01)
  *G06Q 20/32*  (2012.01)

(52) U.S. Cl.
  CPC ....... *G06Q 20/385* (2013.01); *G06Q 20/3278* (2013.01)

(58) Field of Classification Search
  CPC .. G06Q 40/00; G06Q 20/385; G06Q 20/3278; G06Q 40/06
  See application file for complete search history.

(56) References Cited

U.S. PATENT DOCUMENTS

| | | | |
|---|---|---|---|
| 5,412,192 A | 5/1995 | Hoss | |
| 5,778,067 A | 7/1998 | Jones et al. | |
| 6,016,484 A | 1/2000 | Williams et al. | |
| 6,865,547 B1 | 3/2005 | Brake et al. | |
| 6,873,974 B1 | 3/2005 | Schutzer | |

(Continued)

FOREIGN PATENT DOCUMENTS

| WO | WO-2011/113121 A1 | 9/2011 |
|---|---|---|
| WO | WO-2012/139003 A2 | 10/2012 |

(Continued)

OTHER PUBLICATIONS

The University of Alaska staff, Managing Finance Reports with Vista Plus, Aug. 2008, The University of Alaska, web, 2-20 (Year: 2008).*

(Continued)

*Primary Examiner* — I Jung Liu
(74) *Attorney, Agent, or Firm* — Foley & Lardner LLP

(57) ABSTRACT

Systems and methods include a payer user device including a near field communication transceiver configured to facilitate communications with devices within a threshold range from the payer user device, and a digital payment application that detects a payer user device, receives a first user input regarding a selection of the payee user device and a second user input regarding an amount of funds to provide a user of the payee user device, causes a transaction request to be received by the payee user device that includes a tokenized identifier that provides a provider computing system information to identify an account associated with a user of the payer user device, and receives an indication from the provider computing system indicating that the transaction has been completed or is in process of being completed.

16 Claims, 3 Drawing Sheets

(56) References Cited

U.S. PATENT DOCUMENTS

| | | | |
|---|---|---|---|
| 7,765,481 B2 * | 7/2010 | Dixon | G06Q 30/06 |
| | | | 715/738 |
| 7,909,243 B2 | 3/2011 | Merkow et al. | |
| 7,930,225 B2 | 4/2011 | Wahlberg et al. | |
| 7,945,776 B1 | 5/2011 | Atzmony et al. | |
| 7,970,669 B1 | 6/2011 | Santos | |
| 8,019,365 B2 | 9/2011 | Fisher | |
| 8,078,140 B2 | 12/2011 | Baker et al. | |
| 8,126,806 B1 | 2/2012 | Dimartino et al. | |
| 8,160,959 B2 | 4/2012 | Rackley et al. | |
| 8,215,560 B2 | 7/2012 | Granucci et al. | |
| 8,280,788 B2 | 10/2012 | Perlman | |
| 8,401,904 B1 | 3/2013 | Simakov et al. | |
| 8,433,657 B2 | 4/2013 | Dinan | |
| 8,452,257 B2 | 5/2013 | Granucci et al. | |
| 8,467,766 B2 | 6/2013 | Rackley et al. | |
| 8,468,587 B2 | 6/2013 | Blinn et al. | |
| 8,489,067 B2 | 7/2013 | Rackley, III et al. | |
| 8,504,699 B2 | 8/2013 | Vaughan et al. | |
| 8,533,123 B2 | 9/2013 | Hart | |
| 8,538,845 B2 | 9/2013 | Liberty | |
| 8,548,908 B2 | 10/2013 | Friedman | |
| 8,555,361 B2 | 10/2013 | Nakhjiri et al. | |
| 8,566,237 B2 | 10/2013 | Forzley | |
| 8,566,239 B2 | 10/2013 | Arthur et al. | |
| 8,615,468 B2 | 12/2013 | Varadarajan | |
| 8,627,424 B1 | 1/2014 | O'Malley et al. | |
| 8,639,621 B1 | 1/2014 | Ellis et al. | |
| 8,645,971 B2 | 2/2014 | Carlson et al. | |
| 8,676,704 B2 | 3/2014 | Ledbetter et al. | |
| 8,700,729 B2 | 4/2014 | Dua | |
| 8,706,628 B2 | 4/2014 | Phillips | |
| 8,725,576 B2 | 5/2014 | Fisher | |
| 8,725,577 B2 | 5/2014 | Fisher | |
| 8,732,080 B2 | 5/2014 | Karim | |
| 8,744,966 B1 | 6/2014 | Amacker et al. | |
| 8,750,901 B1 | 6/2014 | Gupta et al. | |
| 8,768,834 B2 | 7/2014 | Zacarias et al. | |
| 8,774,781 B1 | 7/2014 | Speiser et al. | |
| 8,781,955 B2 | 7/2014 | Schamer et al. | |
| 8,831,677 B2 | 9/2014 | Villa-Real | |
| 8,838,501 B1 | 9/2014 | Priebatsch | |
| 8,843,125 B2 | 9/2014 | Kwon et al. | |
| 8,843,417 B2 | 9/2014 | Hammad | |
| 8,880,432 B2 | 11/2014 | Collins, Jr. | |
| 8,924,246 B1 | 12/2014 | Chen et al. | |
| 8,925,805 B2 | 1/2015 | Grigg et al. | |
| 8,972,297 B2 | 3/2015 | Kay et al. | |
| 8,977,251 B2 | 3/2015 | Grigg et al. | |
| 8,989,712 B2 | 3/2015 | Wentker et al. | |
| 9,020,836 B2 | 4/2015 | Fisher et al. | |
| 9,026,460 B2 | 5/2015 | Grigg et al. | |
| 9,027,109 B2 | 5/2015 | Wolberg-Stok et al. | |
| 9,037,509 B1 | 5/2015 | Ellis et al. | |
| 9,043,240 B2 | 5/2015 | Langus et al. | |
| 9,098,190 B2 | 8/2015 | Zhou et al. | |
| 9,177,307 B2 | 11/2015 | Ross et al. | |
| 9,208,488 B2 | 12/2015 | Liberty | |
| 9,218,624 B2 | 12/2015 | Moghadam | |
| 9,256,876 B2 | 2/2016 | Vasant Akole et al. | |
| 9,286,606 B2 | 3/2016 | Diamond | |
| 9,324,068 B2 | 4/2016 | Soundararajan | |
| 9,361,616 B2 | 6/2016 | Zhou et al. | |
| 9,691,058 B2 | 6/2017 | Epler et al. | |
| 9,741,051 B2 | 8/2017 | Carpenter et al. | |
| 10,380,596 B1 | 8/2019 | Butler et al. | |
| 2002/0032602 A1 | 3/2002 | Lanzillo et al. | |
| 2003/0028481 A1 | 2/2003 | Flitcroft et al. | |
| 2003/0055785 A1 | 3/2003 | Lahiri | |
| 2003/0056096 A1 | 3/2003 | Albert et al. | |
| 2004/0230535 A1 | 11/2004 | Binder et al. | |
| 2004/0236632 A1 | 11/2004 | Maritzen et al. | |
| 2004/0260646 A1 | 12/2004 | Berardi et al. | |
| 2005/0021401 A1 | 1/2005 | Postrel | |
| 2005/0043997 A1 | 2/2005 | Sahota et al. | |
| 2005/0086492 A1 | 4/2005 | Nicodemus et al. | |
| 2005/0138377 A1 | 6/2005 | First et al. | |
| 2005/0184145 A1 | 8/2005 | Law et al. | |
| 2005/0235363 A1 | 10/2005 | Hibbard et al. | |
| 2006/0235795 A1 | 10/2006 | Johnson et al. | |
| 2006/0253335 A1 | 11/2006 | Keena et al. | |
| 2007/0174873 A1 | 7/2007 | Griggs | |
| 2007/0198432 A1 * | 8/2007 | Pitroda | G06Q 20/327 |
| | | | 705/64 |
| 2007/0244811 A1 | 10/2007 | Tumminaro | |
| 2008/0005006 A1 * | 1/2008 | Tritt | G06Q 40/00 |
| | | | 705/36 R |
| 2008/0006685 A1 | 1/2008 | Rackley, III et al. | |
| 2008/0033878 A1 | 2/2008 | Krikorian et al. | |
| 2008/0127317 A1 | 5/2008 | Nakhjiri | |
| 2008/0208742 A1 | 8/2008 | Arthur et al. | |
| 2008/0242274 A1 | 10/2008 | Swanburg et al. | |
| 2008/0319887 A1 | 12/2008 | Pizzi et al. | |
| 2009/0048971 A1 | 2/2009 | Hathaway et al. | |
| 2009/0177563 A1 | 7/2009 | Bernstein et al. | |
| 2009/0271287 A1 | 10/2009 | Halpern | |
| 2009/0319427 A1 | 12/2009 | Gardner et al. | |
| 2010/0114731 A1 | 5/2010 | Kingston et al. | |
| 2010/0114733 A1 | 5/2010 | Collas et al. | |
| 2010/0125495 A1 | 5/2010 | Smith et al. | |
| 2010/0191602 A1 | 7/2010 | Mikkelsen et al. | |
| 2010/0205077 A1 | 8/2010 | Hammad | |
| 2011/0055080 A1 | 3/2011 | Ahlers et al. | |
| 2011/0106674 A1 | 5/2011 | Perlman | |
| 2011/0191160 A1 | 8/2011 | Blackhurst et al. | |
| 2011/0196782 A1 | 8/2011 | Allen et al. | |
| 2011/0251892 A1 | 10/2011 | Laracey | |
| 2011/0270748 A1 | 11/2011 | Graham et al. | |
| 2011/0289004 A1 | 11/2011 | Prakash et al. | |
| 2011/0295748 A1 | 12/2011 | Woodriffe | |
| 2011/0313918 A1 * | 12/2011 | Lawson | G06Q 40/00 |
| | | | 705/40 |
| 2012/0011063 A1 | 1/2012 | Killian et al. | |
| 2012/0018511 A1 | 1/2012 | Hammad | |
| 2012/0078735 A1 | 3/2012 | Bauer et al. | |
| 2012/0078751 A1 | 3/2012 | MacPhail et al. | |
| 2012/0110634 A1 | 5/2012 | Jakobsson | |
| 2012/0130731 A1 | 5/2012 | Canetto | |
| 2012/0143705 A1 | 6/2012 | Bhattacharya et al. | |
| 2012/0150687 A1 | 6/2012 | Hart | |
| 2012/0158589 A1 | 6/2012 | Katzin et al. | |
| 2012/0185317 A1 | 7/2012 | Wong | |
| 2012/0185387 A1 | 7/2012 | Doyle | |
| 2012/0192254 A1 | 7/2012 | Garcia Perez et al. | |
| 2012/0196586 A1 | 8/2012 | Grigg et al. | |
| 2012/0197793 A1 | 8/2012 | Grigg et al. | |
| 2012/0197794 A1 | 8/2012 | Grigg et al. | |
| 2012/0209749 A1 | 8/2012 | Hammad et al. | |
| 2012/0239417 A1 | 9/2012 | Pourfallah et al. | |
| 2012/0253852 A1 | 10/2012 | Pourfallah et al. | |
| 2012/0254021 A1 | 10/2012 | Wohied et al. | |
| 2012/0271712 A1 | 10/2012 | Katzin et al. | |
| 2012/0284130 A1 | 11/2012 | Lewis et al. | |
| 2012/0296720 A1 | 11/2012 | Pirillo | |
| 2012/0303425 A1 | 11/2012 | Katzin et al. | |
| 2012/0310774 A1 | 12/2012 | Chassin | |
| 2012/0323762 A1 | 12/2012 | Kapur et al. | |
| 2012/0330837 A1 | 12/2012 | Persaud et al. | |
| 2013/0006848 A1 | 1/2013 | Kuttuva | |
| 2013/0018777 A1 | 1/2013 | Klein | |
| 2013/0018792 A1 | 1/2013 | Casey et al. | |
| 2013/0030941 A1 | 1/2013 | Meredith et al. | |
| 2013/0042261 A1 | 2/2013 | Tavormina et al. | |
| 2013/0054454 A1 | 2/2013 | Purves et al. | |
| 2013/0060679 A1 | 3/2013 | Oskolkov et al. | |
| 2013/0060696 A1 | 3/2013 | Martin et al. | |
| 2013/0060708 A1 | 3/2013 | Oskolkov et al. | |
| 2013/0073365 A1 | 3/2013 | McCarthy | |
| 2013/0073459 A1 | 3/2013 | Zacarias et al. | |
| 2013/0080241 A1 | 3/2013 | Fisher | |
| 2013/0110658 A1 | 5/2013 | Lyman et al. | |
| 2013/0132854 A1 | 5/2013 | Raleigh et al. | |
| 2013/0144663 A1 | 6/2013 | Qawami et al. | |
| 2013/0166332 A1 | 6/2013 | Hammad | |

(56) References Cited

U.S. PATENT DOCUMENTS

| | | |
|---|---|---|
| 2013/0185167 A1 | 7/2013 | Mestre et al. |
| 2013/0191227 A1 | 7/2013 | Pasa et al. |
| 2013/0191277 A1 | 7/2013 | O'Leary et al. |
| 2013/0191278 A1 | 7/2013 | O'Leary et al. |
| 2013/0200999 A1 | 8/2013 | Spodak et al. |
| 2013/0204785 A1 | 8/2013 | Monk et al. |
| 2013/0226751 A1 | 8/2013 | Friedholm et al. |
| 2013/0226799 A1 | 8/2013 | Raj |
| 2013/0232032 A1 | 9/2013 | Chaturvedi et al. |
| 2013/0238455 A1 | 9/2013 | Laracey |
| 2013/0246260 A1 | 9/2013 | Barten et al. |
| 2013/0246261 A1 | 9/2013 | Purves et al. |
| 2013/0246265 A1 | 9/2013 | Al-Sahli |
| 2013/0260734 A1 | 10/2013 | Jain et al. |
| 2013/0262309 A1 | 10/2013 | Gadotti |
| 2013/0262316 A1 | 10/2013 | Hruska |
| 2013/0282588 A1 | 10/2013 | Hruska |
| 2013/0290121 A1 | 10/2013 | Simakov et al. |
| 2013/0290169 A1 | 10/2013 | Bathula et al. |
| 2013/0317928 A1 | 11/2013 | Laracey |
| 2013/0317984 A1* | 11/2013 | O'Leary ............... G06Q 20/10 705/40 |
| 2013/0332353 A1 | 12/2013 | Aidasani et al. |
| 2014/0006129 A1 | 1/2014 | Heath |
| 2014/0006276 A1 | 1/2014 | Grigg et al. |
| 2014/0012750 A1 | 1/2014 | Kuhn et al. |
| 2014/0019352 A1 | 1/2014 | Shrivastava |
| 2014/0019360 A1 | 1/2014 | Yang |
| 2014/0038546 A1 | 2/2014 | Neal et al. |
| 2014/0058855 A1 | 2/2014 | Hussein et al. |
| 2014/0058936 A1 | 2/2014 | Ren et al. |
| 2014/0074655 A1 | 3/2014 | Lim et al. |
| 2014/0074724 A1 | 3/2014 | Gordon et al. |
| 2014/0081783 A1 | 3/2014 | Paranjape et al. |
| 2014/0081854 A1 | 3/2014 | Sanchez et al. |
| 2014/0089171 A1 | 3/2014 | Gandhi |
| 2014/0096215 A1 | 4/2014 | Hessler |
| 2014/0100975 A1 | 4/2014 | Van |
| 2014/0101048 A1 | 4/2014 | Gardiner et al. |
| 2014/0108254 A1 | 4/2014 | Lee |
| 2014/0114856 A1 | 4/2014 | Jung et al. |
| 2014/0122310 A1 | 5/2014 | Torrens et al. |
| 2014/0122563 A1 | 5/2014 | Singh et al. |
| 2014/0129357 A1 | 5/2014 | Goodwin |
| 2014/0136352 A1 | 5/2014 | Ramakrishna et al. |
| 2014/0188718 A1 | 7/2014 | Grossman et al. |
| 2014/0188719 A1 | 7/2014 | Poornachandran et al. |
| 2014/0207680 A1 | 7/2014 | Rephlo |
| 2014/0214640 A1 | 7/2014 | Mallikarjunan et al. |
| 2014/0222670 A1 | 8/2014 | Concannon |
| 2014/0244506 A1 | 8/2014 | Gramling |
| 2014/0250003 A1 | 9/2014 | Levchin et al. |
| 2014/0279097 A1 | 9/2014 | Alshobaki et al. |
| 2014/0279469 A1 | 9/2014 | Mendes |
| 2014/0279566 A1 | 9/2014 | Verma et al. |
| 2014/0282068 A1 | 9/2014 | Levkovitz et al. |
| 2014/0297435 A1 | 10/2014 | Wong |
| 2014/0297520 A1 | 10/2014 | Levchin et al. |
| 2014/0297524 A1 | 10/2014 | Ravindranath et al. |
| 2014/0304095 A1 | 10/2014 | Fisher |
| 2014/0310182 A1 | 10/2014 | Cummins |
| 2014/0337175 A1 | 11/2014 | Katzin et al. |
| 2014/0337621 A1 | 11/2014 | Nakhimov |
| 2014/0347265 A1 | 11/2014 | Aimone et al. |
| 2014/0351072 A1 | 11/2014 | Wieler et al. |
| 2014/0351126 A1 | 11/2014 | Priebatsch |
| 2014/0351130 A1 | 11/2014 | Cheek et al. |
| 2014/0365363 A1 | 12/2014 | Knudsen et al. |
| 2014/0376576 A1 | 12/2014 | Jespersen et al. |
| 2014/0379576 A1 | 12/2014 | Marx et al. |
| 2015/0019944 A1 | 1/2015 | Kalgi |
| 2015/0026049 A1 | 1/2015 | Theurer et al. |
| 2015/0032627 A1 | 1/2015 | Dill et al. |
| 2015/0035643 A1 | 2/2015 | Kursun |
| 2015/0046339 A1 | 2/2015 | Wong et al. |
| 2015/0074774 A1 | 3/2015 | Nema et al. |
| 2015/0088633 A1 | 3/2015 | Salmon et al. |
| 2015/0089568 A1 | 3/2015 | Sprague et al. |
| 2015/0095075 A1 | 4/2015 | Breuer et al. |
| 2015/0100442 A1 | 4/2015 | Van Heerden et al. |
| 2015/0112781 A1 | 4/2015 | Clark et al. |
| 2015/0140960 A1 | 5/2015 | Powell et al. |
| 2015/0154588 A1 | 6/2015 | Purves et al. |
| 2015/0178693 A1 | 6/2015 | Solis |
| 2015/0186875 A1 | 7/2015 | Zhang et al. |
| 2015/0186886 A1 | 7/2015 | Schwalb et al. |
| 2015/0187021 A1 | 7/2015 | Moring et al. |
| 2015/0193869 A1 | 7/2015 | Del Vecchio et al. |
| 2015/0220914 A1 | 8/2015 | Purves et al. |
| 2015/0229622 A1 | 8/2015 | Grigg et al. |
| 2015/0254698 A1 | 9/2015 | Bondesen et al. |
| 2015/0254699 A1 | 9/2015 | Bondesen et al. |
| 2015/0287015 A1 | 10/2015 | Kaplinger et al. |
| 2015/0319158 A1 | 11/2015 | Kumnick |
| 2015/0324768 A1 | 11/2015 | Filter et al. |
| 2015/0332252 A1 | 11/2015 | Shahrokhi et al. |
| 2015/0339662 A1 | 11/2015 | Huang et al. |
| 2015/0371326 A1 | 12/2015 | Montesano et al. |
| 2016/0004876 A1 | 1/2016 | Bye et al. |
| 2016/0012465 A1 | 1/2016 | Sharp |
| 2016/0026999 A1 | 1/2016 | Kurian |
| 2016/0042341 A1 | 2/2016 | Griffin et al. |
| 2016/0042344 A1 | 2/2016 | Thimmana et al. |
| 2016/0063496 A1 | 3/2016 | Royyuru et al. |
| 2016/0065370 A1 | 3/2016 | Le Saint et al. |
| 2016/0086170 A1 | 3/2016 | Hurt et al. |
| 2016/0086179 A1 | 3/2016 | Barbier |
| 2016/0092696 A1 | 3/2016 | Guglani et al. |
| 2016/0092866 A1 | 3/2016 | Liberty et al. |
| 2016/0092868 A1 | 3/2016 | Salama et al. |
| 2016/0092874 A1 | 3/2016 | O'Regan et al. |
| 2016/0125396 A1 | 5/2016 | Brickell et al. |
| 2016/0125409 A1 | 5/2016 | Meredith et al. |
| 2016/0125417 A1 | 5/2016 | Huang et al. |
| 2016/0132875 A1 | 5/2016 | Blanco et al. |
| 2016/0140555 A1 | 5/2016 | Scipioni |
| 2016/0162889 A1 | 6/2016 | Badenhorst |
| 2016/0342992 A1 | 11/2016 | Lee |
| 2017/0017958 A1 | 1/2017 | Scott et al. |
| 2017/0061402 A1 | 3/2017 | Mobin et al. |
| 2017/0061406 A1 | 3/2017 | Adams et al. |
| 2017/0164139 A1 | 6/2017 | Deselaers et al. |
| 2017/0193468 A1 | 7/2017 | Chougule et al. |
| 2018/0007052 A1 | 1/2018 | Quentin |
| 2018/0068308 A1 | 3/2018 | Gupta et al. |
| 2018/0082283 A1 | 3/2018 | Sharma |
| 2018/0157336 A1 | 6/2018 | Harris et al. |
| 2018/0365675 A1 | 12/2018 | Sivaraman |
| 2018/0374076 A1 | 12/2018 | Wheeler |
| 2019/0304029 A1 | 10/2019 | Murray et al. |

FOREIGN PATENT DOCUMENTS

| | | |
|---|---|---|
| WO | WO-2013/079793 A1 | 6/2013 |
| WO | WO-2014/111888 A1 | 7/2014 |
| WO | WO-2014/207615 A1 | 12/2014 |
| WO | WO-2015/023172 A2 | 2/2015 |
| WO | WO-2016/009198 A1 | 1/2016 |
| WO | WO-2016/053975 A1 | 4/2016 |
| WO | WO-2016/097879 A1 | 6/2016 |
| WO | WO-2016/172107 A1 | 10/2016 |
| WO | WO-2016/196054 A1 | 12/2016 |

OTHER PUBLICATIONS

"Cashcloud Mobile eWallet", FinTech Forum Exchange, Jul. 1, 2016. 4 pages.

"Cashcloud mobile eWallet", Popote Payments, www.popotepayments.com, 2016. 6 pages.

Lehdonvirta et al., UbiPay: Minimizing Transaction Costs with Smart Mobile Payments, Proceedings of the 6th International Conference on Mobile Technology, Application & Systems, ACM, Jan. 2009, retrieved from the Internet at http://www.researchgate.net/

(56) References Cited

OTHER PUBLICATIONS profile/Tatsuo_Nakajima/publication/220982951_UbiPay_minimizing_transaction_costs_with_smart_mobile_payments/links/548e9dad0cf225bf66a607bb.pdf on Oct. 30, 2015, 8 pages.
Smart Card Alliance, "The Mobile Payments and NFC Landscape: A U.S. Perspective," Sep. 2011. 53 pages.
White, Ron, "How Computers Work", Que Publishing, 7th Ed, Oct. 15, 2003, p. 4. 23 pages.
A Smart Card Alliance Payments Council White Paper; Publication date: Sep. 2011; Publication No. PC-11002; 191 Clarksville Rd. Princeton Junction, NJ 08550 www.smartcardalliance.org (Year: 2011).
How to Control Children's Spending on Debit Cards | Money | by Jill Paperworth, May 10, 2009, https:www.theguardian.com/money/2009/mar/.../children-debit-cards-online-spend . . . (Year: 2009).
EMV, "Payment Tokenisation Specification Technical Framework", 2014 EMVCO, LLC. 84 pages.

\* cited by examiner

SYSTEMS AND METHODS FOR MAKING PERSON-TO-PERSON PAYMENTS VIA MOBILE CLIENT APPLICATION

CROSS-REFERENCE TO RELATED PATENT APPLICATIONS

The present application claims the benefit of and priority to U.S. Provisional Patent Application No. 62/669,865 filed May 10, 2018, which is hereby incorporated by reference in its entirety.

FIELD

The present application relates to electronic payment transactions. More particularly, the present application relates to systems and methods for making anonymous person-to-person payments via a mobile application.

BACKGROUND

People generally use cash, checks, or cards to make payments. To make a payment using a card, the card can be swiped, inserted, or waved at a point of sale, or card information can be entered and submitted online without requiring a physical card to be present at the point of sale. In addition, as smartphones are becoming increasingly more prevalent, people can use mobile devices, such as a cell phone, to make payments using a mobile payment application. To make a payment using a mobile application on a mobile device, a user typically enters their card information or account information into the mobile application, which then enables the user to make payments using the mobile device. In spite of the existence of mobile payment technology, one type of transaction where cash and checks still predominate is person-to-person payments (e.g., when tipping a valet driver or a performer on the street).

SUMMARY

One example embodiment relates to a method. The method includes detecting, by a processor of a payer user device utilizing a network interface circuit of the payer user device, a payee user device. The method includes receiving, by the processor via a user interface of the payer user device, a first user input and a second user input, where the first user input regards a selection of the payee user device and the second user input regards an amount of funds to provide a user of the payee user device. The method includes causing, by the processor via a network interface circuit of the payer user device, a transaction request to be received by the payee user device, where the transaction request is configured to cause a notification to be generated and displayed on the payee user device. The notification includes a payment offer. The transaction request includes a tokenized identifier that provides a provider computing system information to identify an account associated with a user of the payer user device. The method includes receiving, by the processor via the network interface circuit, an indication from the provider computing system indicating that the user of the payee user device accepted the payment offer and that the amount of funds have been or are in process of being withdrawn from the account associated with the user of the payer user device.

Another example embodiment relates to payer user device. The payer user device includes a near field communication transceiver and a digital payments application. The near field communication transceiver is configured to communications with devices within a threshold range from the payer user device. The digital payment application is communicatively coupled with the near field communication transceiver. The digital payment application is configured to detect, via the near field communication transceiver, a payee user device. The digital payment application is configured to receive, via a user interface of the payer user device, a first user input and a second user input, where the first user input regards a selection of the payee user device, and the second user input regards an amount of funds to provide a user of the payee user device. The digital payment application is configured to cause, via the near field communication transceiver, a transaction request to be received by the payee user device, where the transaction request is configured to cause a notification to be generated and displayed on the payee user device. The notification includes a payment offer. The transaction request includes a tokenized identifier that provides a provider computing system information to identify an account associated with a user of the payer user device. The digital payment application is configured to receive, via the near field communication transceiver, an indication from the provider computing system indicating that the user of the payee user device accepted the payment offer and that the amount of funds have been or are in process of being withdrawn from the account associated with the user of the payer user device.

Another example embodiment relates to a method. The method includes detecting, by a processor of a payer user device utilizing a network interface circuit of the payer user device, a payee user device. The method includes receiving, by the processor via a user interface of the payer user device, a first user input and a second user input, where the first user input regards a selection of the payee user device, and the second user input regards an amount of funds to provide a user of the payee user device. The method includes providing, by the network interface circuit, a transaction request to the payee user device, where the transaction request includes a payment offer and a tokenized identifier that provides a first provider computing system information to identify an account associated with a user of the payer user device. The first provider computing system is associated with an account of the user of the payee user device. The method includes receiving, by the processor via the network interface circuit, an indication from a second provider computing system associated with an account of a user of the payer user device. The indication indicates to the user of the payer user device that the amount of funds have been or are in process of being withdrawn from the account associated with the user of the payer user device.

These and other features, together with the organization and manner of operation thereof, will become apparent from the following detailed description when taken in conjunction with the accompanying drawings.

DETAILED DESCRIPTION

Figure 1:
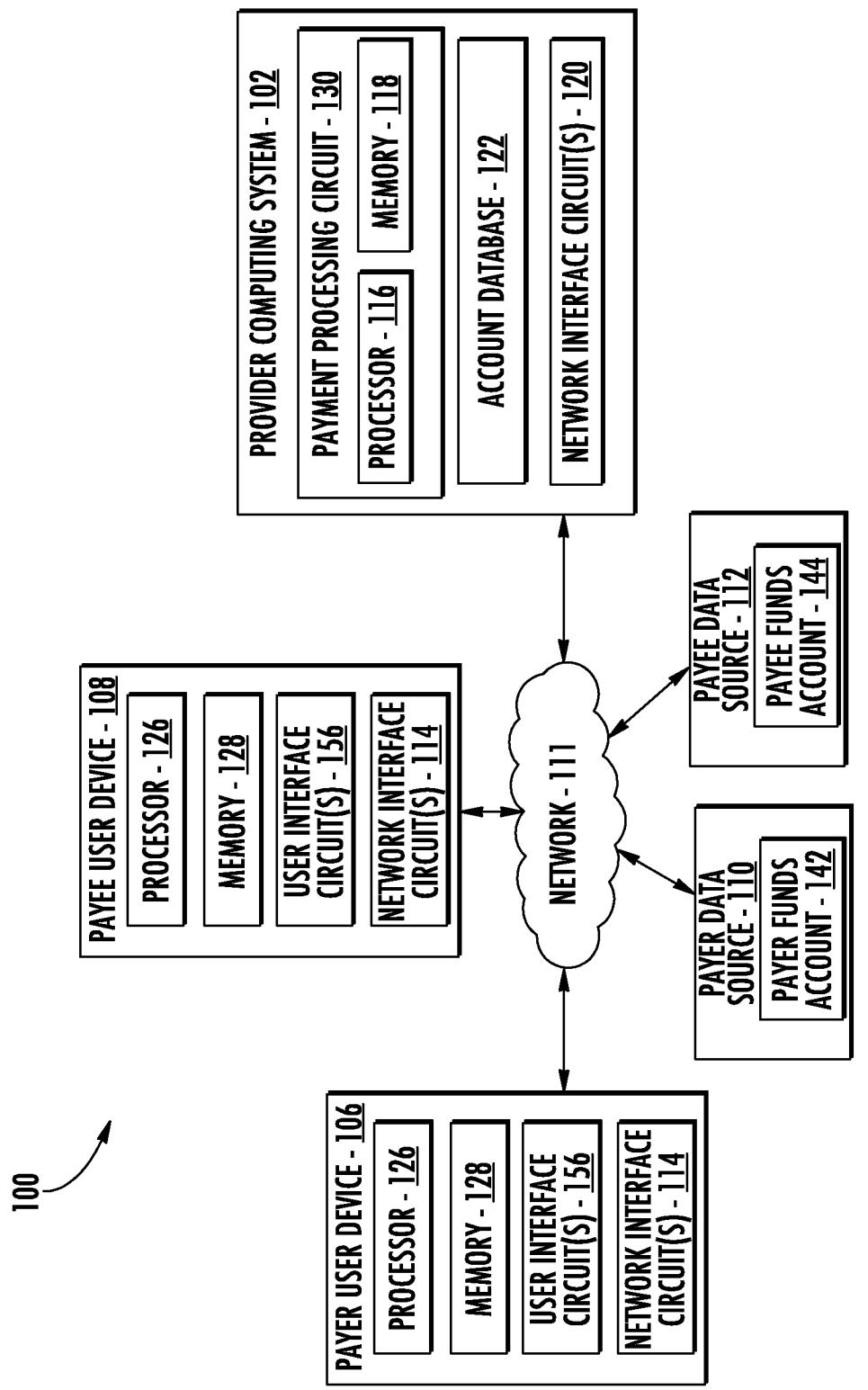
FIG. 1 is a diagram of a computing system for making person-to-person payments from a first wireless device to a second nearby wireless device via a mobile client application, according to an example embodiment.

Referring generally to the figures, systems and methods for making person-to-person payments via a mobile client application according to one or more example embodiments are shown and described. A person or entity can use the systems and methods disclosed herein to make a payment to another person or entity. For example, a first user may wish to compensate a second user for a service performed by the second user. However, oftentimes a user does not have physical money available to them in such a situation. As will be appreciated, disclosed herein are systems and methods that enable a first device (e.g., a smartphone) of a first user to detect the presence of a second device of a second user, and that enable funds to be sent from an account associated with the first user to an account associated with the second user.

The embodiments of the person-to-person payment system described herein improve current computing systems and payment systems by performing certain steps that cannot be done by conventional computing systems or human actors. For example, the person-to-person payment system is configured such that a first user device may detect a second user device that is in a general proximity of the first user device and capable of receiving a message without first sending a message. In this way, the first user device is not required to receive, for example, an input including a phone number of the second user device from the second user device or from another device before the first user device is able to send a message to the second user device. In other words, a payor may be able to detect and send a message or payment to a payee without inputting a phone number of a device of the payee into the device of the payor. This configuration enables both the payor and the payee to be secure in remaining "anonymous" during a transaction, while still allowing for a fast and efficient transaction.

The systems, methods, and computer implementations disclosed herein improve current computing systems and payment systems by facilitating payment between two parties by forming an anonymous link between the parties via a near-field communication transceiver without requiring the parties to interact with one another in person or to know any personal information, account information or contact information about one another. In other words, the payment can be anonymous such that the parties do not obtain and/or retain any personal or identifying information about the other party to the transaction. The clock time, processing time, programmatic instructions required to authenticate a user account, and other requirements of a central processing unit of the system, memory utilization of the system, and utilization of other system resources are reduced because a transaction between the parties is accomplished by only having access to only minimal data about the other party (e.g., a proximity of the other party) without requiring the provisioning of traditionally exchanged information needed to conduct mobile wallet transactions. Accordingly, system security is improved and payments are more quickly completed than current payment systems.

In addition, embodiments described herein beneficially enable a first user device and a second user device to notify a payor and a payee in real-time of the status of a transaction by, for example, displaying a notification or sounding an alert. Further, both the first user device and second user device may receive inputs from the first user and second user, respectively, to allow for an efficient transactional interaction. In some embodiments, this may be accomplished by a graphical user interface (GUI) which may be generated and visually presented to the users through their respective mobile computing devices.

The GUI displayed on the user devices can present a notification to the respective user providing a summary of the transaction. The notification can be provided in the form of a transaction summary reachable directly from a menu of the mobile device of the user (e.g., by hovering over an application icon of a mobile wallet application, by selecting the application icon without actually launching the application). The transaction summary indicates a summary of the payment (e.g., an amount of the payment). By selecting the transaction summary, the mobile wallet application is launched and automatically navigated to a sub-screen of the mobile wallet application providing additional and more specific details of the transaction (e.g., time of transaction, currency used, whether the payment is a repeat payment from a same prior payer). The transaction summary can provide a summary of more than one transaction (e.g., a list of payment amounts received organized by transaction time). Accordingly, the transaction summary provides only limited data when the mobile wallet application is in an unlaunched state, and further details of each transaction can be accessed by selecting the corresponding transaction summary to automatically launch the mobile wallet application and to be automatically navigated to the corresponding sub-screen displaying additional and more specific details of the transaction, thereby providing an improved GUI for electronic devices, and particularly electronic mobile devices.

Referring now to FIG. 1, a block diagram of a system 100 for making person-to-person payments is shown according to an exemplary embodiment. The system 100 is shown to include a provider computing system 102, a payer user device 106, and a payee user device 108. The provider computing system 102 can be associated with a provider institution, such as a bank, a clearinghouse, or other payment processing institutions.

The provider computing system 102 is generally structured to communicate with external systems over the network 111. In this regard, the network 111 generally provides communicable and operative coupling between the provider computing system 102, the payer user device 106, the payee user device 108, and/or other components described herein to provide and facilitate the exchange of communications (e.g., data, instructions, messages, values, commands, etc.). Accordingly, the network 111 may include any network or combination of networks including wired (e.g., Ethernet, etc.) and/or wireless networks (e.g., 802.11X, ZigBee, Bluetooth, Wi-Fi, etc.). In some arrangements, the network 111 includes the Internet. In further embodiments, the network 111 includes a proprietary banking network to provide secure or substantially secure communications. In some embodiments, a payer user device 106 and a payee user device 108 may be in a same general vicinity of one another. In some arrangements, the payer user device 106 and the payee device 108 can be in peer-to-peer communication with one another. In other words, the network 111 may include a peer-to-peer (P2P) network, which can be decentralized and distributed network architecture enabling the devices to communicate directly using one or more known communication protocols, such as NFC, Wi-Fi and Bluetooth protocols.

The provider computing system 102 is shown to include a payment processing circuit 130 having a processor 116 and a memory 118. The processor 116 may be implemented as a general-purpose processor, an application specific integrated circuit (ASIC), one or more field programmable gate arrays (FPGAs), a digital signal processor (DSP), a group of processing components, or other suitable electronic processing components. The memory 118 may include one or more memory devices (e.g., RAM, NVRAM, ROM, Flash Memory, hard disk storage) and may store data and/or computer code for facilitating the various processes described herein. Moreover, the memory 118 may be or include tangible, non-transient volatile memory or non-volatile memory. Accordingly, the memory 118 may include database components, object code components, script components, or any other type of information structure for supporting the various activities and information structures described herein.

The provider computing system 102 further includes a network interface circuit 120, which is used to establish connections with other components of the system 100 by way of the network 111. In this regard, the network interface circuit 120 is structured to include hardware (e.g., Ethernet controller, memory, etc.) and software necessary to facilitate data communications for the provider computing system 102 over the network 111 or directly with an external computing system. The network interface circuit 120 includes program logic that facilitates connection of the provider computing system 102 to the network 111. The network interface circuit 120 supports communication between the provider computing system 102 and other systems. In some embodiments, the network interface circuit 120 communicates via a secured wired connection. In some arrangements, the network interface circuit 120 includes the hardware and machine-readable media sufficient to support communication over multiple channels of data communication. Further, in some arrangements, the network interface circuit 120 includes cryptography capabilities to establish a secure or relatively secure communication session with the provider computing system 102. In this regard, data may be encrypted and transmitted to prevent or substantially prevent the threat of hacking.

In some embodiments, the payer device 106 and the payee user device 108 can be in the same general vicinity, and accordingly allow for radio frequency (RF) signals transmitted by the payer user device 106 and payee user device 108 to be received directly by one another. For example, each of the payer user device 106 and payee user device 108 can include a wireless transceiver that includes an antenna and can scan the vicinity for signals from other nearby devices and establish a peer-to-peer connection (e.g., an NFC connection) with one of the other devices. In some embodiments, the connection can only be established if the devices are within a predetermined distance of each other. In some embodiments, that distance is in the range of zero to twelve inches. In some embodiments, that distance is in the range of zero to six inches. In some embodiments, that distance is in the range of 1.4 to 1.8 inches. In some embodiments, that distance is 1.6 inches. In some embodiments, that distance is one to five feet.

The payer user device 106 and payee user device 108 can be configured and equipped substantially similar to one another. Accordingly, only the payer user device 106 is described in further detail below, and it should be appreciated that the payee user device 108 may include substantially the same features. The payer user device 106 is shown to include a processor 126, a memory 128, a user interface circuit 156, and a network interface circuit 114. The processor 126 and the memory 128 can be structured as described herein with reference to the processor 116 and the memory 118, respectively. The network interface circuit 114 can be any suitable network interface, such as described herein with reference to the network interface circuit 120. The user interface circuit 156 can be any suitable interface allowing a user to input and/or view information, such as described herein with reference to the payment processing circuit 130. For example, in some embodiments, the payer device 106 and payee device 108 are smartphones, tablet devices, or wearable devices, and the user interface circuit 156 is a touch-screen interface of the smartphone, tablet device, or wearable device.

The payer user device 106 can be associated with a user. For example, the payer user device 106 may allow a user associated with the payer user device 106 to conduct a transaction with a user associated with the payee user device 108. In other words, the first user may be associated with the payer user device 106, and the second user may be associated with the payee user device 108. In this regard, the payer user device 106 can also be structured to facilitate mobile payments, such as through an NFC transceiver and a mobile payment application. In some embodiments, the payer user device 106 and/or payee user device 108 can be structured to receive information via a text or SMS message, an email and/or an alert. For example, the payer user device 106 can be structured to receive a text message from the provider computing system 102 via the network 111 with information relating to a person-to-person payment. The payer user device 106 can be structured to display received information to the user via the user interface circuit 156.

The user associated with the payee user device 108 and the user associated with the payer user device 106 may hold one or more accounts with one or more provider entities, such as banks or other financial institutions, which may serve as data sources for the provider computing system 102. For example, the user associated with the payer device 106 may hold a first account at a first provider institution, which, in some embodiments, may be the payer data source 110. The user associated with the payee user device 108 may hold a second account at a second provider institution, which, in some embodiments, may be the payee data source 112. In some embodiments, the first provider institution and the second provider institution are the same entity. In other embodiments, the first provider and the second provider are different entities. Either one or both the first provider institution and the second provider institution can be associated with the provider computing system 102.

The payer user device 106 and payee user device 108 are mobile computing systems configured to run applications and communicate with other computer systems over a network 111. For example, the payer user device 106 and payee user device 108 may be configured to allow the user associated with the payer user device 106 and/or the user associated with the payee user device 108 to view account balances, manage accounts, provide loans, and/or transfer funds from a given account by using, for example, a mobile banking circuit. The mobile banking circuit of the payer user device 106 and payee user device 108 may comprise, be part of, and/or be configured to interact with (for example, through an application programming interface (API)) with one or more circuits of the provider computing system 102, which are described further herein.

In some embodiments, the memory 128 of the payer user device 106 and the memory 128 of the payee user device 128 may each have a mobile wallet application (comprising executable instructions) that is executed by the processor 116. For example, the payer user device 106 may have a first mobile wallet application installed thereon which is associated with a first entity (e.g., a first financial institution which operates the payer data source 110), and the payee user device 108 may have a second mobile wallet application installed thereon which is associated with another entity (e.g., a second financial institution which operates the payer data source 110). Accordingly, the payer and payee may both be registered users of mobile wallet applications, such that account information and other information about the payer and payee is known within one or more of the various systems depicted in FIG. 1, and such that the functionality described herein may be accessed via respective mobile wallet applications of the payer and the payee.

As described herein, the network interface circuit 120 is structured to enable all or some components of the provider computing system 102 to connect to other systems within or outside the person-to-person payment system 100. For example, the network interface circuit 120 may connect to the payer user device 106 and/or the payee user device 108.

In some embodiments, the user interface circuit 156 is structured to provide alerts to the payer user device 106 and/or the payee user device 108 to allow the user associated with the payer user device 106 and/or the user associated with the payee user device 108 to receive and respond to notifications related to person-to-person payments. In some embodiments, such as the embodiments of FIGS. 3A-3C, the electronic user interface is a graphical user interface (GUI) visually presented to the user associated with the payer user device 106 through the payer user device 106 and/or user associated with the payee user device 108 through the payee user device 108. In other embodiments, the electronic user interface may comprise aural, auditory, tactile, kinesthetic, and/or haptic system(s) and/or component(s) for notifying and interacting with the payer user device 106 and/or payee user device 108. For example, the payer user device 106 and/or the payee user device 108 may buzz, vibrate, trigger an LED light indicator, and/or otherwise alert the user associated with the payer user device 106 and/or the user associated with the payee user device 108 to the alert(s) and/or notification(s) received through the user interface circuit 156.

Also connected to the network 111 are the payer data source 110 and/or payee data source 112. The contributors to the payer data source 110 and/or payee data source 112 may include the user associated with payer user device 106 and the user associated with the payee user device 108. In an example embodiment, at least one user associated with the payer user device 106 is connected to at least one payer data source 110 via the network 111 through the payer user device 106 (e.g., via a first mobile wallet application). In an example embodiment, at least one user associated with the payee user device 108 is connected to at least one payee data source 112 via the network 111 through the payee user device 108 (e.g., via a second mobile wallet application, which may be the same brand as the first mobile wallet application (e.g., both users use the same bank-branded mobile application), or which may be a different brand of mobile wallet application as the first mobile application (e.g., one user uses a bank-branded mobile application and the other uses a non-bank branded mobile wallet application or a mobile wallet application which is branded by a different bank).

With respect to the provider computing system 102, payer data source 110, and payee data source 112, various configurations are contemplated herein. In one example embodiment, all of the provider computing system 102, payer data source 110, and payee data source 112 are operated by the same entity. For example, the payer and the payee may both bank at the same financial institution. In another example embodiment, the provider computing system 102 and the payer data source 110 are operated by a first entity and the payee data source 112 is operated by a second entity different from the first entity. For example, the payer and the payee may bank at different financial institutions that communicate via a backend API connection. In yet another example embodiment, the provider computing system 102 is operated by a first entity, and the payer data source 110 and the payee data source 112 are operated by a second entity different from the first entity. In yet another example embodiment, each of the provider computing system 102, the payer data source 110, and the payee data source 112 is operated by a separate entity, all three entities being different from each other. For example, the payer and the payee may bank at different financial institutions that communicate via a third-party intermediary (i.e., associated with the provider computing system 102). As used herein, the term "operated" refers to a computing system being hosted, run, maintained, configured and/or managed to support business operations.

The payment processing circuit 130 facilitates person-to-person payments. This is accomplished, in an exemplary embodiment, by detecting a payee user device 108 and a payer user device 106, the payer user device 106 receiving a first user input from the user associated with the payer user device 106 and a second user input from the user associated with the payer user device 106, providing a notification to the payee user device 108, the payee user device 108 eliciting a user input from the user associated with the payee user device 108, initiating an electronic funds transfer from a payer data source 110 to a payee data source 112, and providing a notification to the payer user device 106 and/or the payee user device 108.

In an example embodiment of FIG. 1, the provider computing system 102 includes a payment processing circuit 130, an account database 122, and a network interface circuit 120. The account database 122 may store information about a payer funds account 142 and a payee funds account 144. For example, if the provider computing system 102 is provided by a third-party intermediary, the account database 122 may store one or more unique identifiers for each of the users of the provider computing system 102. For example, the payer may bank at a first financial institution, the payee may bank at a second financial institution, and both may also be registered users of the provider computing system 102. The identifiers may be different than the account numbers for the accounts held at the first and second financial institutions, but may be used by the provider computing system 102 to appropriately route the transaction to the first and second financial institutions, and may be further used by the first and second financial institutions to process the transaction (e.g., by converting the identifier to actual account number information). One or both of the identifiers may be communicated between the devices 106, 108 as part of executing the transaction. These circuits and/or data storage entities may be combined as needed such that one or more data storage entities and/or circuit(s) are implemented in a hybrid form. An example of a hybrid implementation is a data storage entity having a shell and/or providing an API such that a library of code (for example, executable functions containing Data Manipulation Language (DML) instructions) may be used by entities within or outside the person-to-person payment system 100.

In some embodiments, the payment processing circuit 130 allows the user associated with the payer user device 106 and/or the user associated with the payee user device 108 to select a transaction amount, to select a destination payee user device 108 and to accept a payment offer. Such a transaction may be initiated, for example, when the payer selects an option to send money to an initially not-yet-selected payee. The payer user device 106 may then receive a first user input and a second user input from the user associated with the payer user device 106. The first user input may be a selection of a destination payee user device 108. The destination payee user device 108 may be associated with the user of the payee user device 108 and the payee data source 112. The second user input provided to the payer user device 106 by the user associated with the payer user device 106 may be a transaction amount. The transaction amount may be, for example, a payment offer, or an amount that the user associated with the payer user device 106 wishes to transfer to the user associated with the payee user device 108. As a result of the first and second user inputs provided to the payer user device 106, the payer user device 106 may provide a notification to the payee user device 108, notifying of a payment offer from the user associated with the payer user device 106. The notification may allow the user associated with the payee user device 108 to accept the payment offer from the user associated with the payer user device 106. Specifically, the payee user device 108 may elicit a user input from the user associated with the payee user device 108. Thus, the user associated with the payee user device 108 may select to accept the payment offer from the user associated with the payer user device 106. The payment processing circuit 130 may then initiate an electronic funds transfer from the payer funds account 142 to the payee funds account 144. The payment processing circuit 130 may then provide a notification to the payer user device 106 and/or the payee user device 108 to notify that the transaction is complete. The notification can be provided in the form of a transaction summary reachable directly from a menu of the mobile device of the user (e.g., by hovering over an application icon of a mobile wallet application, by selecting the application icon without actually launching the application). The transaction summary indicates a summary of the payment (e.g., an amount of the payment). By selecting the transaction summary, the mobile wallet application is launched and automatically navigated to a sub-screen of the mobile wallet application providing additional and more specific details of the transaction (e.g., time of transaction, currency used, whether the payment is a repeat payment from a same prior payer). The transaction summary can provide a summary of more than one transaction (e.g., a list of payment amounts received organized by transaction time). Accordingly, the transaction summary provides only limited data when the mobile wallet application is in an unlaunched state, and further details of each transaction can be accessed by selecting the corresponding transaction summary to automatically launch the mobile wallet application and to be automatically navigated to the corresponding sub-screen displaying additional and more specific details of the transaction. In some embodiments, the user associated with the payer device 106 and/or the user associated with the payee user device 108 may modify some aspects of the payment offer. For example, the user associated with the payer user device 106 may modify the amount of the payment offer, or cancel the payment offer, as part of the authorization process facilitated by the payment processing circuit 130.

In some embodiments, the payment processing circuit 130 allows the user associated with the payer user device 106 to use the payment processing circuit 130 to decide which payee user device(s) 108 that the user associated with the payer user device 106 would like to select, or ultimately, send a payment offer to. In an example, the payer user device 106 may be able to detect a payee user device 108 associated with various individuals in a general proximity, and may receive a user input regarding which device to send a payment offer. The features and functionalities of the payment processing circuit 130, or sometimes only some features and functionalities of the payment processing circuit 130, can be carried out locally via a client mobile application installed on the payer user device 106 and the payee user device 108. For example, some features and functionalities of the payment processing circuit 130 can be carried out or occur within the provider computing system 102 while other features and functionalities are carried out or occur within at least one of the payer user device 106 and the payee user device 108 via software downloaded and installed on the respective device or via software running on a cloud computing system accessible by at least one of the payer user device 106 and the payee user device 108.

In some embodiments, rather than or in addition to allowing the user associated with the payer user device 106 to enter preferences through an electronic user interface of the payer user device 106, the payment terms circuit 124 is structured to analyze information from one or more payer data source(s) 112 in order to obtain, calculate, project, and/or otherwise generate the payee's preference payment terms. The funds account 142, 144, according to various embodiments, include functionality for managing, funding, and receiving transactions In some embodiments, the payment processing circuit 130 is structured to generate a funds transfer transaction 154. In some embodiments, each electronic item representing the funds transfer transaction 154 is time stamped such that a first time stamp indicates when the user associated with the payer user device 106 created the payment offer and a second time stamp indicates when the user associated with the payee user device 108 accepted the payment offer. In some embodiments, each electronic item representing funds transfer transaction 154 includes a data item indicating the status of funds transfer transaction 154, such as pending, accepted, disputed, declined, new terms proposed (with a pointer to the corresponding electronic record), etc. In some embodiments, each electronic item representing funds transfer transaction 154 contains a first electronic signature of the user associated with the payer user device 106 and a second electronic signature of the user associated with the payee user device 108 indicating that the status is set and/or verified by the respective party.

In some embodiments, the payment processing circuit 130 is structured to initiate an electronic funds transfer (such as a payment offer from the payer funds account 142 to the payee funds account 144) based on payment offer terms. In some embodiments, the payment processing circuit 130 is configured to transfer and/or schedule the funds immediately upon receiving acceptance of payment offer terms from the payer user device 106 and/or the payee user device 108. In some embodiments, prior to the funds transfer, the payment processing circuit 130 is configured to check the balance of the payer funds account 142 relative to the amount of the funds transfer transaction 154 to determine whether sufficient funds are available.

In one example, the payer initiates a transaction with the payee by selecting an indication of the payee user device 108 using the payer user device 106 and also selecting a payment amount. For example, the payer can view available payee user devices within a predetermined range (e.g., within five feet, within one foot, within two inches) of the payer user device 106, select a particular device such as the payee user device 108, and select an amount of funds to transfer. Upon initiating the payment (e.g., by selecting a submission button, by selecting the payee device, by selecting the amount of funds), a payment instruction is communicated from the payer user device 106 to the payee user device 108. The payment instruction contains a tokenized identifier of the payer user device 106 (e.g., a cell phone number, an email address, an account number, a user name, a randomized number) and the amount of the funds to be transferred. The payee user device 108 then communicates the payment instruction to a financial institution associated with the payee user device 108. The financial institution associated with the payee user device 108 processes the payment instruction (e.g., crediting an account associated with the payee user device 108, authenticating the payment instruction) and communicates with the provider computing system 102 to inform the provider computing system 102 that the payment instruction has been received and has been processed or is being processed by the financial institution associated with the payee user device 108. The provider computing system 102 communicates with a financial institution associated with the payer user device 106 to inform that financial institution of the transaction (e.g., so that that financial institution debits an account associated with the payer user device 106).

The tokenized identifier of the payer user device 106 identifies an account of the user of the user payer user device 106 including a financial institution associated with the account of the user such that the tokenized identifier can be used by a receiving system (e.g., a financial institution of the payee user device 108 or a third party payment processing system) to identify the user and execute the transaction. For example, the receiving system (e.g., the provider computing system 102) can interpret the tokenized identifier to identify the financial institution of the payee user device 108 and the amount of funds that should be credited to the payee's account, transmit data to the financial institution of the payer indicating the payer's account should be debited, and then credit the payee's account or transmit data to the financial institution of the payee indicating the payee's account should be credited. Accordingly, the payee user device 108 transmits both identifying information regarding the account of the payee and the tokenized identifier of the payer user device 106. In some embodiments, the identifying information regarding the account of the payee is not tokenized (e.g., when the receiving system is a financial institution of the payee), and in other embodiments the identifying information regarding the account of the payee is tokenized (e.g., when the receiving system is a third party system that then relays the tokenized information of both the payee and payer to their respective financial institutions.

In some embodiments, the tokenized identifier of the payer user device 106 can only be interpreted by the provider computing system 102. In some embodiments, the tokenized identifier of the payer user device 106 can be interpreted by any or all of the provider computing system 102, the financial institution of the payer, the financial institution of the payer, and any third party systems. The tokenized identifier of the payer user device 106 can be interpreted by any device or system as part of the carrying out the transaction to result in a debiting and crediting of accounts of the payee and payer, respectively. It will be appreciated that the same features of the tokenized identifier of the payer user device 106 can be embodied by the tokenized identifier of the payee user device 108 or the modified tokenized identifier. In some embodiments, the tokenized identifier includes non-tokenized information that identifies a financial institution for the tokenized identifier to be communicated to (e.g., the financial institution of the payee, the financial institution of the payer).

Figure 2:
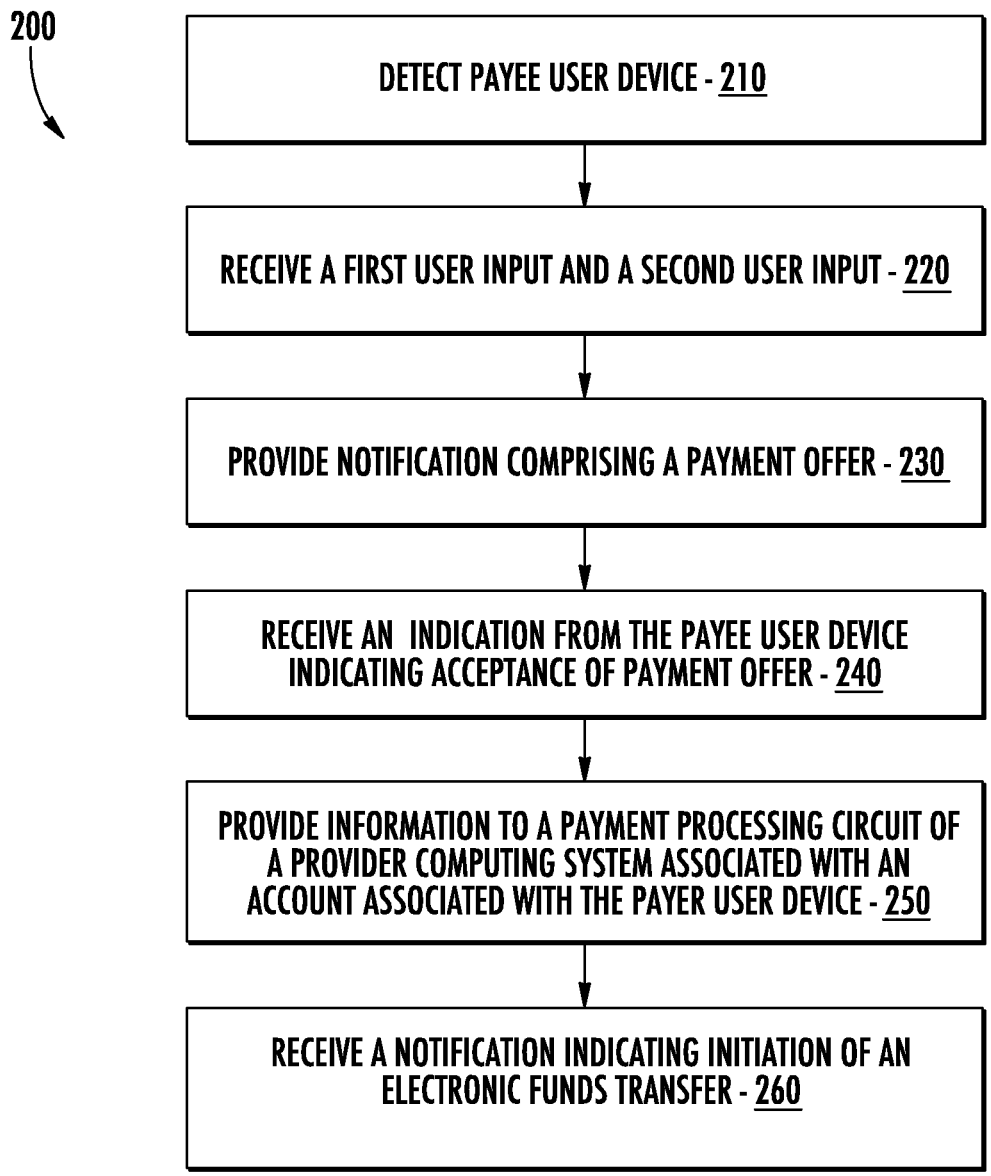
FIG. 2 is a flow diagram of a method of making person-to-person payments from a first wireless device to a second nearby wireless device via a mobile client application, according to an example embodiment.

Accordingly, in some embodiments, the payer user device 106 provides data including the tokenized identifier of the payer user device 106 to the payee user device 108, and the payee user device 108 provides data including the tokenized identifier of the payer user device 106 and the tokenized identifier of the payer user device 106 to the provider computing system 102. In some embodiments, the payee user device 108 modifies the tokenized identifier received from the payer user device 106 to create a modified tokenized identifier that includes the information received from the payer user device 106 as well additional information added by the payee user device 108, and then communicates the modified tokenized identifier to the provider computing system 102. Referring now to FIG. 2, a flow diagram of a method 200 of managing person-to-person payments is shown, according to an example embodiment. In some embodiments, the method 200 is performed by the provider computing system 102, the payer user device 106, and/or the payee user device 108 such that some or all of the functionality of the electronic circuits of the provider computing system 102 is performed on and/or by the payer user device 106 and/or the payee user device 108. In some embodiments, the method 200 is performed by the payment processing circuit 130 of the provider computing system 102. While performing the method 200, the provider computing system 102, for example, communicates data over the network interface circuit 120 of the provider computing system 102, and the payer user device 106 and/or payee user device 108 communicate data over the network interface circuit 114 of the corresponding device.

The method 200 comprises detecting a payee user device 108, receiving a first user input and a second user input from the user associated with the payer user device 106, providing a notification to the payee user device 108, receiving an indication of acceptance by a user associated with the payee user device 108 from the payee device, providing information to a payment processing circuit 130, and receiving a notification indicating an electronic funds transfer payment amount. The notification may allow the payee 108 to accept the payment offer from the payer 106. The payment processing circuit 130 may then initiate an electronic funds transfer from the payer funds account 142 to the payee funds account 144. The payment processing circuit 130 may then provide a notification to the payer user device 106 and/or the payee user device 108 to notify that the transaction is complete.

At 210, the network interface circuit 114 of the payer user device 106 is structured to detect a payee user device 108. For example, a payer user device 106 may detect the payee user device 108 by way of the payee user device 108 receiving a signal from the payer user device 106. In some embodiments, the signal may be transmitted by the payer user device 106 and received by the payee user device 108 due to the general proximity of the payer user device 106 and payee user device 108. In some embodiments, the payer user device 106 may be detectable and/or detect other payee user devices 108 when the Wi-Fi network is enabled and/or configured to receive RF signals. In this way, it should be appreciated that multiple payee user devices 108 and/or payer user devices 106 may be detectable when nearby and may receive RF signals.

Figure 3C:
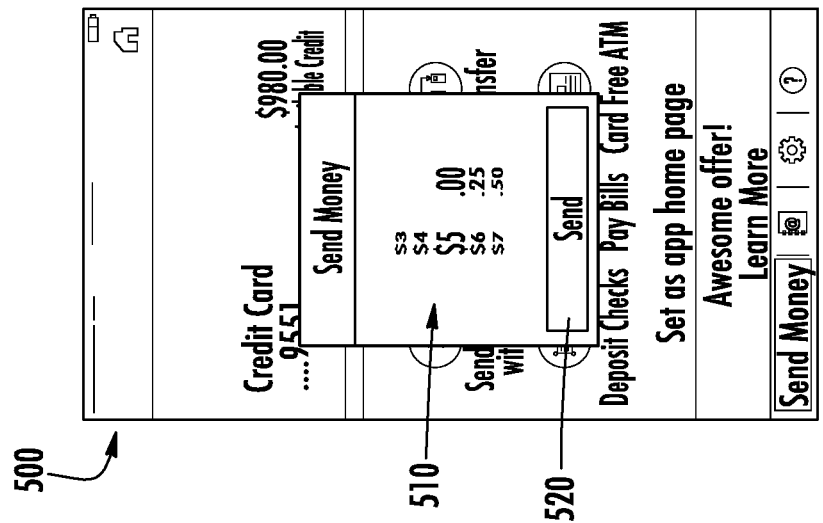
FIGS. 3A-C are mobile client application user interfaces provided by a mobile client application on user devices, according to example embodiments.

At 220, the user interface circuit 156 of the payer device 106 is structured to receive a first user input and a second user input from the user associated with the payer user device 106. The payer user device 106 may be associated with a payer data source 110. The first user input may be received by the payer user device 106 from the user associated with the payer user device 106, and may be a selection of a destination payee user device 108. For example, the payer user device 106, upon detecting nearby payee user devices 108, may display a list of potential payee user devices 108. The potential payee user devices 108 may include a name or an alias associated with the potential payee user device 108. The payer user device 106 may receive a selection by the user associated with the payer user device 106, indicating a destination payee user device 108. The destination payee user device 108 may be associated with the user of the payee user device 108 and the payee data source 112. The payer user device 106 may receive the second user input, which may be a transaction amount. The transaction amount may be, for example, a payment offer, or an amount that the user associated with the payer user device 106 wishes to transfer to the user associated with the payee user device 108. Entry of the transaction amount can be accomplished in a number of ways. The payer user device 106 can be configured such that the user associated with the payer user device 106 may manually key in the transaction amount. Alternately, as shown in FIG. 3C, the payer user device 106 may be configured such that the user associated with the payer user device 106 may select the transaction amount from a list of displayed numbers in an amount field 510.

At 230, the payment processing circuit 130 may provide a notification to the payer user device 106. The notification may notify the user associated with the payee user device 108 of the payment offer provided by the payer user device 106, and allow the user of the payee user device 108 to accept the payment offer from the payer user device 106. According to various embodiments, the notification may be provided as an email, text, a pop-up window on the payee user device 108, etc. The notification may contain a link to an executable file accessible by the user associated with the payee user device 108 to instruct the payment processing circuit 130 to generate and render an electronic form having an interface configured to receive an acceptance of the payment offer.

At 240, the payer user device 106 may receive an indication of acceptance from the payee user device 108. Specifically, the network interface circuit 114 of the payer user device 106 may receive a signal from the payee user device 108. The signal from the payee user device 108 may be the result of the user associated with the payee user device 108 providing a user input. For example, the payee user device 108 may be configured such that the user input may include a user to press a button or otherwise interacting with the user interface to accept the payment offer. In some embodiments, the payment processing circuit 130 is structured to obtain acceptance of the payment offer terms from the payer user device 106. According to various embodiments, the payment offer may contain a link for the user associated with the payee user device 108 to click on to indicate acceptance. Thus, the user associated with the payee user device 108 may select to accept the payment offer from the user associated with the payer user device 106.

At 250, the network interface circuit 114 of the payer user device 106 may provide information to the payment processing circuit 130. The information provided to the payment processing circuit 130 may indicate account information for the account associated with the payer user device 106. For example, the payment processing circuit 130 may determine and effectively link with the payer funds account 142 associated with the payer user device 106.

At 260, the payer user device 106 and/or the payee user device 108 may receive a notification by the network interface circuit 114. The notification may indicate the initiation of an electronic funds transfer payment amount from the account associated with the payer user device 106 to a target account associated with the payee user device 108. For example, the account associated with the payer user device 106 may be the payer funds account 142. The target account associated with the payee user device 108 may be the payee funds account 144. In some embodiments, the notification may indicate to the user associated with the payer user device 106 and/or the user associated with the payee user device 108 that the transaction is complete. In some embodiments, the payment processing circuit 130 is structured to build a notification. For example, the notification is an electronic record that includes data fields populated with values including personally identifying information for the user associated with the payer user device 106 and/or the user associated with the payee user device 108. The personally identifying information for the parties may include an account handle, user name, account number in combination with a reference to a specific system, email address, social media handle, name, telephone number, and/or email address, etc. The notification may further include the amount of the funds transfer transaction, such as the amount of the payment offer. The payer user device 106 and/or payee user device 108 may be configured such that the notification may allow for user input by way of the user interface circuit 116. For example, the payer user device 106 and/or payee user device 108 may be configured such that a user may acknowledge the notification, or may minimize it. In some embodiments, the notification presented to the payee user device 108 does not include information identifying the identity of the user of the payer user device 106 such the user of the payer user device 106 can remain anonymous to the user of the payee user device 108.

In another example, the notification at 260 may be provided in the form of a transaction summary reachable directly from a menu of the mobile device of the user (e.g., by hovering over an application icon of a mobile wallet application, by selecting the application icon without actually launching the application). The transaction summary indicates a summary of the payment (e.g., an amount of the payment). By selecting the transaction summary, the mobile wallet application is launched and automatically navigated to a sub-screen of the mobile wallet application providing additional and more specific details of the transaction (e.g., time of transaction, currency used, whether the payment is a repeat payment from a same prior payer). The transaction summary can provide a summary of more than one transaction (e.g., a list of payment amounts received organized by transaction time). Accordingly, the transaction summary provides only limited data when the mobile wallet application is in an unlaunched state, and further details of each transaction can be accessed by selecting the corresponding transaction summary to automatically launch the mobile wallet application and to be automatically navigated to the corresponding sub-screen displaying additional and more specific details of the transaction. This functionality is especially beneficial for mobile devices, which can include small screens or where a multitude of information is displayed on the screen (e.g., application icons, time, date, text message pop-up notification) that the user of the device desires to not conceal by launching the payment application.

Figure 3B:
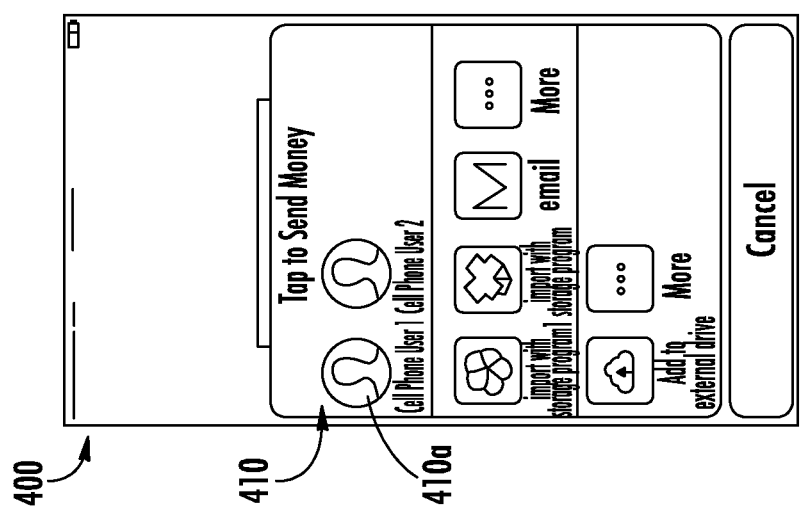
Figure 3A:
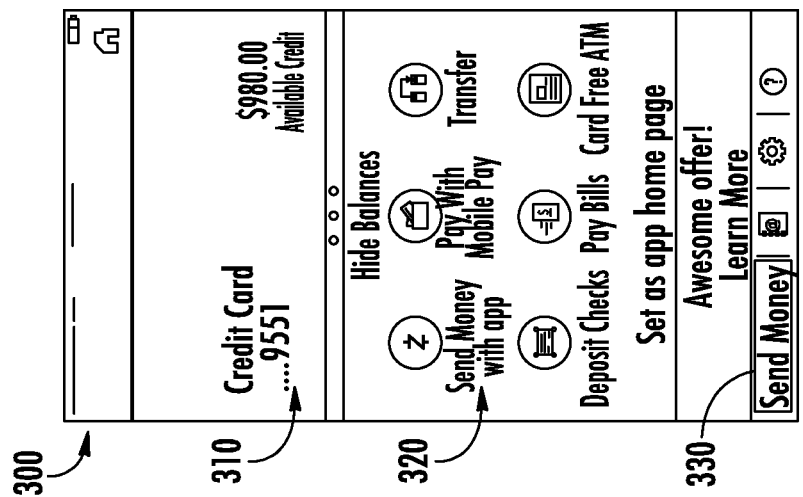

Referring now to FIGS. 3A-3C, user interfaces displayable on the payer user device 106 at several stages in the process of making a person-to-person payment via a mobile client application are shown, according to an example embodiment. The user interfaces can be generated based on processes performed by the payment processing circuit 130 of the provider computing system 102 or based on processes performed locally on the user device by the processor 126 of the user device. In various embodiments, interfaces such as the interface 300 may be displayed on the payer user device 106 and/or the payee user device 108 via the mobile client application. Further, FIGS. 3A-3C illustrate the interface of the mobile client application of the payer user device 106 and the information provided from the payer data source 110, and/or payer funds account 142. It should be appreciated that a similar interface may be provided for the payee user device 108, which would provide the information provided from the payee data source 112, and/or payee funds account 142.

Referring now to FIG. 3A, the user interface 300 includes an account balance field 310, a user action field 320, and a send money action (e.g., initiate payment offer) field 330. The account balance field 310 may display account information from the payer data source 110 and/or payer funds account 142. For example, the last four digits of a linked account may be shown, as well as an available balance or available credit. In some implementations, the account balance field 310 may be configured for a user to touch the screen to be transferred to various interfaces of the mobile client application by way of user interface circuit 116.

The user action field 320 may provide various actions that a user may select which may transfer the user to various interfaces of the mobile client application. In some implementations, the user may press virtual buttons with their fingertip within the action field 320. In this way, for example, a user associated with the payer user device 106 may view or modify different information provided from the payer data source 110 and/or payer funds account 142.

A user may similarly use their fingertip to press the send money action field 330 to select to transfer money to a nearby user. While the send money action field 330 displays "Send", it should be appreciated that the functionality of this field is for initiating the electronic funds transfer via the payment processing circuit 130, and may utilize any networks contemplated within the network interface circuit 120.

In some embodiments, the payer can prompt the payee to generate and display a code on the payee user device 108 or to display a previously generated code on the payee user device 108, the payee user device 108 shares the code with the payer user device 106, the payer user device 106 accepts and receives the code, and the payer user device 106 can then send a payment to the payee user device 108 using the code. The code can be generated using a mobile application installed on the payee user device 108. The devices can communicate with one another using Bluetooth, WiFi, or other network.

In some embodiments, the send money action field 330 can be selected by the payer to initiate a broadcast session to broadcast a payment to or within a nearby network. The payee can open a mobile application installed on the payee user mobile device 106 and select a "receive money" option to display the payer user device 106 or other user devices that are available to connect for transacting. The payee can select a payer, such as the payer user device 106, to make a connection, which then notifies the payer user device 106, once the connection has been made, that the payee user device 108 is ready and able to complete a transaction. The payer user device 106 can be used to select the payee user device 108, fill in an amount of funds to transfer, and provide a user input to complete the transfer. The broadcast network can be a Bluetooth network, a WiFi network, a low energy network, or other network.

In some embodiments, the payer user device 106 makes a request to associate a binary payload (e.g., the message) with a unique-in-tie pairing code (e.g., a token), in which a server makes a temporary association between the message payload and the token. The payer user device 106 can use a combination of Bluetooth, Bluetooth Low Energy, WiFi, and an ultrasonic modem to make the token detectable by nearby devices, and the payer user device 106 also uses these technologies to scan for tokens from other devices. A mobile application installed on the payee user device 108 can associate its subscription with a token and use a mix of Bluetooth, Bluetooth Low Energy, WiFi, and an ultrasonic modem to send it's token to the payer user device 106 and to detect the token of the payer user device 106. Whenever the payer user device 106 detects the token of the payee user device 108, or whenever the payee user device 108 detects the token of the payer user device 106, the detecting device repots the detection of the token to the server. The server facilitates message exchange between the payer user device 106 and the payee user device 108 when both devices associate with a common token, and when API keys used by the mobile application are associated with the same application. Once message exchange is facilitated, the payer user device 106 can be used to fill in an amount of funds to transfer, and receive a user input to complete a transfer to the payee user device 108. The devices can communicate with one another using a Bluetooth network, a low energy network, location beacon messages, or other network.

In some embodiments, payee user device 108 uses a mobile application to generate a token and start broadcasting the token via sound (e.g., using a speaker system of the payee user device 108). The payer user device 106 uses a mobile application to authenticate with the server and to discover the nearby token/payee user device 108. The payer user device 106 initiates payment and completes a transfer to the payee user device 108 via sound. The transmission of data can be in small bits (e.g., an audio QR code). The payer user device 106 can encode the data transmitted and the payee user device 108 decodes the data using a secret key. The devices can communicate with each other using their speakers to transmit data and their microphones to detect and receive data transmitted by the other device.

In some embodiments, the payer user device 106 creates a session by authenticating to a server API with a valid key and starts broadcasting a signal to make the device discoverable by other nearby devices. The payee user device 108 uses a mobile application to authenticate via the server API and start discovering other nearby users (e.g., such as the payer user device 106). The payee user device 108 finds the payer user device 106 and determines an estimated physical distance between the other user devices (e.g., based on physical proximity), and connects to one of the devices based on the device being a suitable distance away from the payee user device 108. Upon connecting to the payer user device 106, the payee user device 108 receives a token or other data needed to transfer funds. The payer user device 106 can then set up a mobile payment application to complete a transaction with the payee user device 108.

As shown in FIG. 3B, upon the user action field 330 receiving a selection from a user to "Send money", the interface 400 provides numerous destinations 410 for transferring funds. The destinations 410 include nearby payee user devices 108 that the payer user device 106 detects. The destinations 410 may receive a selection which identifies a user (i.e. a user associated with the payee device 108) that the user associated with the payer user device 106 wishes to transfer funds to. For example, the payer user device 106 may receive an input from the user associated with the payer user device 106 by way of pressing a virtual button for "Ben's iPhone 6S" 410a, and in doing so, the user associated with the payer user device 106 has identified to the payment processing circuit 130 that it would like to transfer funds to the payee user device 108 (i.e. the user of Ben's iPhone 6S 410a). While the user of the payer user device 106 is able to see that Ben's iPhone 6S 410a and Lorraine's iPhone are both available to transfer funds to, the users of these respective devices do not necessarily know the identity of the user of the user of the payer user device 106. In some embodiments, the identity of the user of the payer user device 106 can be a name given to the payer user device 106 by the user of the payer user device 106, though the name can include an alias, a nickname, or any other information that is not necessarily indicative of the true identity of the user of the payer user device 106.

Referring now to FIG. 3C, upon interface 400 receiving a destination 410 selection, the payer user device 106 generates and displays interface 500. Interface 500 of the payer user device 106 is configured to receive a user input from the user associated with the payer user device 106 indicating the amount of funds to transfer to the destination 410. The payer user device 106 is configured such that the user associated with the payer user device 106 may, for example, use a fingertip to swipe the screen of the payer user device 106 or to make a swipe gesture proximate the screen of the payer user device 106 to indicate a certain amount within the amount field 510. However, the user associated with the payer user device 106 may alternatively key in the value or provide the value via a voice-recognition component of the payer user device 106. The payer user device 106 is configured to receive a selection of the "Send" virtual button 520 by the user of the payer user device 106 to initiate the transfer, per the process identified above.

The embodiments described herein have been described with reference to drawings. The drawings illustrate certain details of specific embodiments that implement the systems, methods and programs described herein. However, describing the embodiments with drawings should not be construed as imposing on the disclosure any limitations that may be present in the drawings.

It should be understood that no claim element herein is to be construed under the provisions of 35 U.S.C. § 112(f), unless the element is expressly recited using the phrase "means for."

As used herein, the term "circuit" may include hardware structured to execute the functions described herein. In some embodiments, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some embodiments, a circuit may take the form of one or more analog circuits, electronic circuits (e.g., integrated circuits (IC), discrete circuits, system on a chip (SOCs) circuits), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR), resistors, multiplexers, registers, capacitors, inductors, diodes, wiring, and so on.

The "circuit" may also include one or more dedicated processors communicatively coupled to one or more dedicated memory or memory devices. In this regard, the one or more processors may execute instructions stored in the memory or may execute instructions otherwise accessible to the one or more processors. In some embodiments, the one or more processors may be embodied in various ways. The one or more processors may be constructed in a manner sufficient to perform at least the operations described herein. In some embodiments, the one or more processors may be shared by multiple circuits (e.g., circuit A and circuit B may comprise or otherwise share the same processor which, in some example embodiments, may execute instructions stored, or otherwise accessed, via different areas of memory). Additionally or alternatively, the one or more processors may be structured to perform or otherwise execute certain operations independent of one or more co-processors. In other example embodiments, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor), microprocessor, etc.

An example system for implementing the overall system or portions of the embodiments might include general-purpose computing computers in the form of computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), etc. In some embodiments, the non-volatile media may take the form of ROM, flash memory (e.g., flash memory such as NAND, 3D NAND, NOR, 3D NOR), EEPROM, MRAM, magnetic storage, hard discs, optical discs, etc. In other embodiments, the volatile storage media may take the form of RAM, TRAM, ZRAM, etc. Combinations of the above are also included within the scope of machine-readable media. In this regard, machine-executable instructions comprise, for example, instructions and data which cause a general-purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components), in accordance with the example embodiments described herein.

It should also be noted that the term "input devices," as described herein, may include any type of input device including, but not limited to, a keyboard, a keypad, a mouse, joystick or other input devices performing a similar function. Comparatively, the term "output device," as described herein, may include any type of output device including, but not limited to, a computer monitor, printer, facsimile machine, or other output devices performing a similar function.

Any foregoing references to currency or funds are intended to include fiat currencies, non-fiat currencies (e.g., precious metals), and math-based currencies (often referred to as cryptocurrencies). Examples of math-based currencies include Bitcoin, Litecoin, Dogecoin, and the like.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure could be accomplished with standard programming techniques with rule-based logic and other logic to accomplish the various database searching steps, correlation steps, comparison steps and decision steps.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principals of the disclosure and its practical application to enable one skilled in the art to utilize the various embodiments and with various modifications as are suited to the particular use contemplated. Other substitutions, modifications, changes and omissions may be made in the design, operating conditions and arrangement of the embodiments without departing from the scope of the present disclosure as expressed in the appended claims.

What is claimed:

1. A method comprising:
   detecting, by a processor of a payer user device utilizing a network interface circuit of the payer user device, a plurality of potential payee user devices within a predetermined range, wherein detecting a potential payee user device further comprises a proximity based search, and wherein the proximity based search utilizes a selectable distance range to list available payee user devices within a selected distance range;
   receiving, by the processor via a user interface of the payer user device, a first user input and a second user input, the first user input regarding a selection of a payee user device from the plurality of potential payee user devices within the predetermined range, the second user input regarding an amount of funds to provide a user of the payee user device;
   causing, by the processor via the network interface circuit of the payer user device, a transaction request to be received by the payee user device, the transaction request configured to cause a notification to be generated and displayed on the payee user device, the notification comprising an anonymous payment offer, the anonymous payment offer being for an electronic transaction, and the transaction request including a tokenized identifier that provides a provider computing system information to identify an account associated with a user of the payer user device; and
   receiving, by the processor via the network interface circuit, an indication from the provider computing system indicating that the user of the payee user device accepted the anonymous payment offer and that the amount of funds have been or are in process of being transferred between the account associated with the user of the payer user device and an account associated with the user of the payee user device, the account associated with the user of the payee user device having been identified by the provider computing system by detokenizing the tokenized identifier subsequent to the tokenized identifier being modified by a processor of the payee user device to include account information of the payee.

2. The method of claim 1, wherein detecting the potential payee user device is based on receipt of a radio frequency signal transmitted by the payee user device.

3. The method of claim 1, further comprising:
   identifying, by the processor, the payee user device based on an identifier of the payee user device; and
   generating, by the processor, display imagery of the identifier of the payee user device on the user interface.

4. The method of claim 1, wherein the tokenized identifier is capable of being interpreted by the provider computing system to identify the account associated with the user of the payer user device without providing the payee user device with untokenized information regarding an identity of the user of the payer user device.

5. The method of claim 1, wherein the notification comprises an alias associated with the payer user device.

6. The method of claim 1, wherein the user of the payee user device does not receive any personally identifying information of the user of the payer user device in an untokenized form, and the user of the payer user device does not receive any personally identifying information of the user of the payee user device in an untokenized form.

7. The method of claim 1, wherein the electronic transaction is completed without further action from either user device upon remittal of the anonymous payment offer to the provider computing system.

8. The method of claim 1, wherein the anonymous payment offer is scheduled to complete at a future time.

9. A method comprising:
   detecting, by a processor of a payer user device utilizing a network interface circuit of the payer user device, a plurality of potential payee user devices within a predetermined range, wherein detecting a potential payee user device further comprises a proximity based search, and wherein the proximity based search utilizes a selectable distance range to list available payee user devices within a selected distance range;
   receiving, by the processor via a user interface of the payer user device, a first user input and a second user input, the first user input regarding a selection of a payee user device from the plurality of potential payee user devices within the predetermined range, the second user input regarding an amount of funds to provide a user of the payee user device;

determining, by the processor, that an account associated with a user of the payer user device has funds matching or exceeding the amount of funds indicated by the second user input;

causing, by the processor via the network interface circuit of the payer user device, a transaction request to be received by the payee user device, the transaction request configured to cause a notification to be generated and displayed on the payee user device, the notification comprising an anonymous payment offer, the anonymous payment offer being for an electronic transaction, and the transaction request including a tokenized identifier that provides a provider computing system information to identify the account associated with the user of the payer user device; and receiving, by the processor via the network interface circuit, an indication from the provider computing system indicating that the user of the payee user device accepted the anonymous payment offer and that the amount of funds have been or are in process of being transferred between the account associated with the user of the payer user device and an account associated with the user of the payee user device, the account associated with the user of the payee user device having been identified by the provider computing system by detokenizing the tokenized identifier subsequent to the tokenized identifier being modified by a processor of the payee user device to include account information of the payee.

10. The method of claim 9, wherein detecting the potential payee user device is based on receipt of a radio frequency signal transmitted by the payee user device.

11. The method of claim 9, further comprising:
identifying, by the processor, the payee user device based on an identifier of the payee user device; and
generating, by the processor, display imagery of the identifier of the payee user device on the user interface.

12. The method of claim 9, wherein the tokenized identifier is capable of being interpreted by the provider computing system to identify the account associated with the user of the payer user device without providing the payee user device with untokenized information regarding an identity of the user of the payer user device.

13. The method of claim 9, wherein the notification comprises an alias associated with the payer user device.

14. The method of claim 9, wherein the user of the payee user device does not receive any personally identifying information of the user of the payer user device in an untokenized form, and the user of the payer user device does not receive any personally identifying information of the user of the payee user device in an untokenized form.

15. The method of claim 9, wherein the electronic transaction is completed without further action from either user device upon remittal of the anonymous payment offer to the provider computing system.

16. The method of claim 9, wherein the anonymous payment offer is scheduled to complete at a future time.

* * * * *